United States Patent

Rademachers et al.

[11] Patent Number: 4,919,726
[45] Date of Patent: Apr. 24, 1990

[54] PROCESS FOR THE PRODUCTION OF RUTILE MIXED-PHASE PIGMENTS

[75] Inventors: Jakob Rademachers, Krefeld; Volker Wilhelm, Bergisch-Gladbach, both of Fed. Rep. of Germany

[73] Assignee: Bayer Aktiengesellschaft, Leverkusen, Fed. Rep. of Germany

[21] Appl. No.: 298,382

[22] Filed: Jan. 18, 1989

[30] Foreign Application Priority Data

Jan. 28, 1988 [DE] Fed. Rep. of Germany ....... 3802469

[51] Int. Cl.$^5$ .............................................. C09C 1/36
[52] U.S. Cl. ..................................... 106/428; 106/436
[58] Field of Search ................................ 106/428, 436

[56] References Cited

U.S. PATENT DOCUMENTS

| 3,022,186 | 2/1962 | Hund | 106/428 |
| 3,560,234 | 2/1971 | Holbein | 106/428 |
| 3,607,338 | 9/1971 | Webb | 106/428 |
| 3,942,999 | 3/1976 | Hinley | 106/428 |
| 4,448,608 | 5/1984 | Jenkins | 106/428 |

OTHER PUBLICATIONS

Ullmanns Encyklopadie der Technishen Chemie, Petrolsulfonate bis Plutonium, Band 18, p. 608.

Primary Examiner—Peter D. Rosenberg
Attorney, Agent, or Firm—Sprung, Horn, Kramer & Woods

[57] ABSTRACT

A process for the production of rutile mixed-phase pigments comprising calcinating of a solid mixture of titanium dioxide or titanium oxide hydroxide with a dye-producing compound of a metal, in one or more directly heated, continuously operated rotary kilns, wherein in terms of material flow, air is introduced into the kiln atmosphere countercurrently to the direction of flow of the solids in the second half of the rotary kiln.

12 Claims, 1 Drawing Sheet

PROCESS FOR THE PRODUCTION OF RUTILE MIXED-PHASE PIGMENTS

BACKGROUND OF THE INVENTION

1. Field of the Invention

This invention relates to a process for the production of rutile mixed-phase pigments by calcination of mixtures of titanium dioxide or titanium oxide hydroxide with dye-producing compounds of metals, optionally with addition of compounds of antimony, niobium or tungsten, in a directly heated, continuously operated rotary kiln.

2. Background Information

Rutile mixed-phase pigments are known from US-A-3,022,186.

Rutile mixed-phase pigments are colored pigments which are obtained by incorporation of colored transition elements in the crystal lattice of the rutile. Metals such as these are predominantly incorporated as guest component in the host lattice of the rutile, of which the cation radii are of the order of the radius of the titanium (IV) ion. If the valency of the cation to be incorporated differs from that of the titanium ion, namely four, another cation having a different valency is added for statistical valency equalization.

Nickel and chromium rutile mixed-phase pigments have acquired considerable significance for large-scale production. In their case, oxides of relatively high valency, particularly antimony oxide and, less frequently, niobium or tungsten oxide, are incorporated for valency equalization with the chromophoric nickel and chromium oxides (Ullmanns Encyklopädie der technischen Chemie, Verlag Chemie GmbH, Weinheim 1979, 4th Edition, Vol. 18, page 608).

The mixed-phase pigments with a rutile lattice are produced by calcination of homogeneous mixtures of titanium dioxide as the host component and the chromophoric guest components at temperatures of up to 1200° C. Instead of oxidic guest components, heat-sensitive compounds of the metals on which the components are based may also be mixed with titanium dioxide, titanium hydroxide or titanium dioxide hydrate, changing on heating in air into the corresponding oxides, for example, hydrates, hydroxides, carbonates, acetates, nitrates or formates.

The raw material mixtures are usually calcined in rotary kilns which may be either directly or indirectly heated. Where the rotary kilns are directly heated, the starting material is best an aqueous suspension containing the starting components, which largely avoids solids being discharged from the kiln with the smoke gases. Where dry mixtures of the starting components are used, it is better to use indirectly heated kilns because, in their case, the quantity of waste gas can be more or less considerably reduced, depending on the starting materials, so that there is no danger of a high discharge of solids.

Obtaining pigments of high quality presupposes, above all, complete rutilization.

In conventional processes, these conditions are satisfied when long residence times are maintained throughout the entire rotary kiln process, leading to a poor volume-time yield and hence to high process costs.

SUMMARY OF THE INVENTION

Accordingly, the object of the present invention is to provide a process for the production of rutile mixed-phase pigments which does not have any of the described disadvantages.

It has now been found that these requirements are satisfied by a process for the production of rutile mixed-phase pigments by calcination of mixtures of titanium dioxide or titanium oxide hydroxide with dye-producing compounds of metal, optionally with addition of compounds of antimony, niobium or tungsten, in a directly heated, continuously operated rotary kiln, which is characterized in that, in terms of material flow, air is supplied to the kiln atmosphere in the second half of the rotary kiln countercurrently to the direction of flow of the solids.

This process is the subject of the present invention.

DETAILED DESCRIPTION OF THE INVENTION

Figure 1:
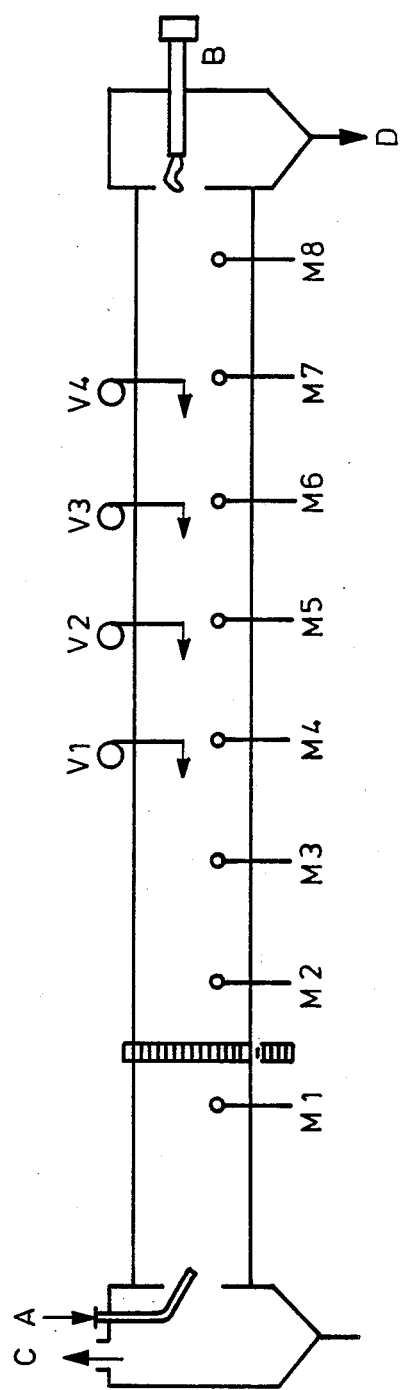
FIG. 1 is a schematic diagram of a kiln for use in the present invention.

In one preferred embodiment, the air is supplied at kiln temperatures of 700° to 900° C. The air itself is preferably at room temperature. The air may also be introduced in several partial quantities over a relatively long section of the kiln. Through the supply of air in accordance with the invention, the overall residence time in the rotary kiln is considerably reduced so that the capacity of the kiln is distinctly increased.

On the other hand, it is also possible, for a smaller increase in capacity, to work with thinner solids suspensions for the feed mixture in an extended drying zone.

To be effective, the quantity of air added in accordance with the invention amounts to between 10 and 100% by volume and preferably to between 30 and 60% by volume of the kiln smoke gases. Instead of introducing air into the second half of the kiln, it would of course also be possible to introduce air into the second of two kilns arranged correspondingly one behind the other.

The feedstock is added as usual in the form of an aqueous suspension containing as its principal constituent titanium-oxygen compounds in the form of anatase or titanium oxide hydroxide.

Where antimony oxide is added for valency equalization, trivalent antimony is frequently used, being brought to the oxidation stage of higher valency during calcination in the rotary kiln.

The kiln is normally charged with high-solids pastes which has solids contents of up to about 50% by weight, either through thickening or through filtration. It has been found that lighter and more saturated mixture-phase pigments are obtained by dilution of the pastes with water to solids contents of from 25 to 35% by weight.

Accordingly, in one particularly preferred embodiment of the process according to the invention, the concentration of the suspension fed to the kiln is between 25 and 50% by weight and preferably between 30 and 35% by weight, based on dry solids.

The air may be introduced into the kiln atmosphere through lance-like feed pipes arranged in the end face of the kiln at the material discharge end. However, it may also be taken in through the casing of the rotary kiln under conditions of reduced pressure. The air is best introduced into the kiln atmosphere by fans which are fixed to the outer wall of the rotary kiln and which are connected to electrical leads through sliding contacts.

The following Examples are intended to illustrate the invention without limiting it in any way.

EXAMPLE 1

With reference to FIG. 1, 150 kg/h of a suspension obtained as described in the following are delivered at A to a lined rotary kiln 12 meters long and 80 cm in diameter: 35 kg chromium oxide and 73 kg antimony (III) oxide are added to 2666 kg of a titanium oxide hydroxide suspension from the hydrolysis step of titanium dioxide pigment production ($TiO_2$ content 27%), followed by thorough stirring and thickening to a paste having a dry solids content of 40% by weight. Hot gas obtained by the combustion of 30 m³ natural gas with 360 m³ air is introduced hourly into the kiln in countercurrent at B. 165 m³/h air at room temperature flow into the kiln through the fans V 1 to V 4. A reduced pressure of 0.2 mbar below atmospheric pressure is established at C by means of a waste-gas fan. The distribution of temperature over the length of the kiln is recorded at the measuring points M 1 to M 8. Temperatures of 300° C. are measured at M 1, slowly rising to 900° C. at M 6. There is a steep increase in temperature from 600° to 850° C. between M 2 and M 4. Temperatures above 1000° C. to 1100° C. are recorded between measuring points M 7 and M 8. An oxygen content of 16% by volume was measured in the region of zone M 1 to M 3.

The clinker accumulated at D (50 to 55 kg/h) yielded a light, color-pure yellow pigment after cooling and grinding.

EXAMPLE 2 (Comparison Example)

Fans V 1 to V 4 were switched off for otherwise the same procedure as in Example 1. Measuring point M 1 showed a temperature of as high as 400° C. while a temperature of 1000° C. was reached between M 6 and M 7. An oxygen content of 13% by volume was measured in the vicinity of measuring point M 1. The colored pigment obtained was dirty and tinged with green. Only when the input was reduced from 150 kg/h to 110 kg/h paste, corresponding to 37–40 kg/h clinker, was it possible to obtain a color-pure yellow pigment.

EXAMPLE 3

A raw material mixture of the type described in Example 1 contained 32% by weight solids. It was not thickened. The reduced pressure was reduced to 0.05 mbar below atmospheric pressure. The input amounted to 170 kg suspension per hour. The other conditions were unchanged. For a similar temperature profile to Example 1, the clinker obtained (45–50 kg/h), after cooling and grinding, yielded a yellow pigment which was lighter and more saturated than the pigment of Example 1.

EXAMPLE 4 (Comparison Example)

The conditions were as in Example 3, except that the fans were switched off. A temperature profile comparable with that of Example 2 was established in the rotary kiln. The pigment obtained was darker and dirtier than the pigment of Example 1.

It will be appreciated that the instant specification and claims are set forth by way of illustration and not limitation, and that various modifications and changes may be made without departing from the spirit and scope of the present invention.

What is claimed is:

1. A process for the production of rutile mixed-phase pigments comprising calcinating of a solid mixture of titanium dioxide or titanium oxide hydroxide with a dye-producing compound of a metal, in one or more directly heated, continuously operated rotary kilns, wherein in terms of material flow, air is introduced into the kiln atmosphere countercurrently to the direction of flow of the solids in the second half of the rotary kiln.

2. A process as claimed in claim 1, which further comprises during the calcinating adding a compound containing an element selected from the group consisting of antimony, nobium and tungsten.

3. A process as claimed in claim 1, wherein the air is introduced at kiln temperatures of 700° to 900° C.

4. A process as claimed in claim 1, wherein the air is introduced at room temperature.

5. A process as claimed in claim 1, wherein the air is introduced in an amount between 10 to 100% by volume of kiln smoke gases.

6. A process according to claim 5, wherein the amount of air is 30 to 60% by volume.

7. A process as claimed in claim 1, wherein there are two kilns and wherein the air is fed into the econd of the two kilns, the kilns being arranged correspondingly one behind the other.

8. A process as claimed in claim 1, wherein the mixture is fed to the kiln in the form of an aqueous suspension.

9. A process as claimed in claim 8, wherein the concentration of the suspension is between 25 and 50% by weight based on the dry solids content.

10. A process as claimed in claim 9, wherein the concentration is 30 to 35% by weight.

11. A process according to claim 1, wherein the dye-producing compound of a metal is nickel.

12. A process according to claim 1, wherein the dye-producing compound of a metal is chromium.

* * * * *